United States Patent
Komura (10) Patent No.: US 6,940,269 B2
(45) Date of Patent: Sep. 6, 2005

(54) METER UNIT HAVING MAGNETIC POINTER POSITION DETECTOR

(75) Inventor: Takashi Komura, Toyota (JP)

(73) Assignee: Denso Corporation, Kariya (JP)

( * ) Notice: Subject to any disclaimer, the term of this patent is extended or adjusted under 35 U.S.C. 154(b) by 208 days.

(21) Appl. No.: 10/636,574

(22) Filed: Aug. 8, 2003

(65) Prior Publication Data

US 2004/0119459 A1 Jun. 24, 2004

(30) Foreign Application Priority Data

Sep. 5, 2002 (JP) .................................... 2002-260029

(51) Int. Cl.[7] .......................... G01R 1/20; G01B 7/14; G01B 7/30; H01B 5/00
(52) U.S. Cl. ................. 324/146; 324/207.25; 324/202; 324/207.17; 324/154 R; 340/688
(58) Field of Search ................ 324/207.17, 207.25, 324/207.26, 207.11, 207.13, 207.15, 207.16, 202, 146, 154 R, 151 R; 340/686.1, 688, 441, 870.04, 815.78; 73/1.88; 116/62.1, 62.3, 291, 303, 284, 297, 32 R; 318/685, 463; 335/205, 236, 206, 237; 235/104

(56) References Cited

U.S. PATENT DOCUMENTS

| | | | | |
|---|---|---|---|---|
| 598,517 A | * | 2/1898 | Heymann et al. ........... 324/202 |
| 3,281,825 A | * | 10/1966 | Sanders et al. ............. 341/15 |
| 4,507,638 A | * | 3/1985 | Brosh ........................ 336/79 |
| 4,613,851 A | * | 9/1986 | Hines ......................... 340/688 |
| 4,631,539 A | * | 12/1986 | Sanders et al. ........ 340/870.29 |
| 4,646,007 A | * | 2/1987 | Faria ........................... 324/146 |
| 4,820,961 A | * | 4/1989 | McMullin .................... 318/587 |
| 4,878,453 A | * | 11/1989 | Inoue et al. ................. 116/288 |
| 5,032,781 A | * | 7/1991 | Kronenberg ................. 318/696 |
| 5,121,109 A | * | 6/1992 | Murphy et al. ............. 340/688 |
| 5,231,508 A | * | 7/1993 | Murphy, Jr. .............. 338/32 H |
| 5,357,242 A | * | 10/1994 | Morgano et al. ........... 340/626 |
| 5,608,386 A | * | 3/1997 | Murphy et al. ............. 340/688 |
| 5,796,343 A | * | 8/1998 | Stauder ....................... 340/626 |
| 6,014,075 A | * | 1/2000 | Fujimori et al. ............ 340/461 |
| 6,043,574 A | * | 3/2000 | Prudham ................... 310/49 R |
| 6,145,369 A | * | 11/2000 | Corbin et al. ................ 73/1.88 |
| 6,585,055 B2 | * | 7/2003 | Mcsheffrey et al. .......... 169/75 |
| 6,624,608 B2 | * | 9/2003 | Komura ....................... 318/696 |
| 6,741,184 B1 | * | 5/2004 | Miller et al. ........... 340/815.78 |
| 2002/0014104 A1 | * | 2/2002 | Komura et al. .............. 73/1.88 |
| 2002/0117988 A1 | | 8/2002 | Komura |
| 2002/0163330 A1 | * | 11/2002 | Sekiya .................. 324/207.17 |

FOREIGN PATENT DOCUMENTS

JP A-2001-264123 9/2001

* cited by examiner

Primary Examiner—Edward Lefkowitz
Assistant Examiner—Kenneth J Whittington
(74) Attorney, Agent, or Firm—Posz Law Group, PLC (57) ABSTRACT

A speed meter unit has a magnetic pointer position detector, including an output coil, a detection coil and a magnetic piece. The output coil generates magnetic flux. The detection coil is for detecting the magnetic flux from the output coil. When a pointer has returned to an initial position, the magnetic flux generated in the output coil can reach the detection coil through the magnetic piece, so that a microcomputer can detect the initial position of the pointer. Such the magnetic pointer position detector is resistive to the soil or the oxidization, so that the speed meter unit can detect the initial position of the pointer accurately and securely.

13 Claims, 13 Drawing Sheets

FIG. 19C2

METER UNIT HAVING MAGNETIC POINTER POSITION DETECTOR

CROSS REFERENNCE TO RELATED APPLICATION

This application is based on Japanese Patent Application No. 2002-260029 filed on Sep. 5, 2002, the disclosure of which is incorporated herein by reference.

FIELD OF THE INVENTION

The present invention relates to a meter unit and a combination meter unit, including a plurality of meter subunits.

BACKGROUND OF THE INVENTION

Heretofore, a meter unit has a scale board, a pointer, a stepping motor and an electric control circuit. The control circuit controls the stepping motor, so that the stepping motor rotationally drives the pointer on the scale board. One of those meter units is disclosed in JP-A-2001-264123.

On activating the meter unit, the control circuit controls the stepping motor so that the pointer should first return to an initial position, i.e., a zero point on the scale board, and the pointer is surely positioned in the initial position by a stopper system.

The stopper system has a mechanical stopping mechanism including a mechanical switch. On retuning the pointer to the initial position on the scale board, the mechanical switch is turned on and outputs a signal indicative of the detected position to the control circuit. Accordingly, the control circuit is enabled to determine that the pointer has positioned in the initial position.

However, in the above mechanical stopping mechanism, while the mechanical switch is soiled or oxidized, the mechanical switch is less likely to accurately function as described above. Accordingly, the meter unit, having the mechanical stopping mechanism, has the potential not to be able to detect that the pointer is positioned in the initial position.

SUMMARY OF THE INVENTION

In view of foregoing circumstances, it is an objective of the present invention to provide a meter unit that can accurately detect the return of the pointer to the initial position and the combination meter unit including such meter subunits.

According to the present invention, a meter unit has a scale, a pointer that rotates on the scale, a stepping motor for rotating the pointer, a gear and a pointer position detector.

The gear is rotated by the stepping motor integrally with the pointer. The pointer position detector can magnetically detect that the pointer is positioned in an initial position. The pointer position detector includes a magnetic piece, an output coil and a detection coil. The magnetic piece is installed in a part of the gear. The output coil generates magnetic flux toward the gear. The detection coil detects the magnetic flux generated in the output coil. In addition, the magnetic flux generated in the output coil can reach the detection coil through the magnetic piece when the pointer is positioned in the initial position on the scale.

Accordingly, the meter unit detects whether the pointer is in the initial position by means of a magnetically detecting mechanism. Therefore, the meter unit can accurately determine it, irrespective of the soil or the oxidation of the concerned members.

Moreover, according to the present invention, a combination meter unit includes a plurality of meter subunits, each structure of which is essentially the same as the above meter unit. Accordingly, each meter subunit of the combination meter unit can detects whether its pointer is in its initial position by means of a magnetically detecting mechanism. Therefore, each meter subunit of the combination meter unit can accurately determine it, irrespective of the soil or the oxidation of the concerned members.

BRIEF DESCRIPTION OF THE DRAWINGS

The invention, together with additional objectives, features and advantages thereof, will be best understood from the following description, the appended claims and the accompanying drawings in which:

FIGS. 8A1 to 8B3 are illustrative views and graphs illustrating the operation of the meter unit;

FIGS. 19A1 to 19C2 are plan and side views of a pointer position detector of a meter unit or a combination meter unit according to the fifth embodiment of the present invention, illustrating the operation thereof; and FIG. 20 is an illustrative view of a microcomputer and a pointer control unit of a meter unit or a combination meter

DETAILED DESCRIPTION OF THE PRESENTLY PREFERRED EMBODIMENTS

Preferred embodiments of the present invention will be described hereinafter with reference to the accompanying drawings.

(First Embodiment)

Figure 1:
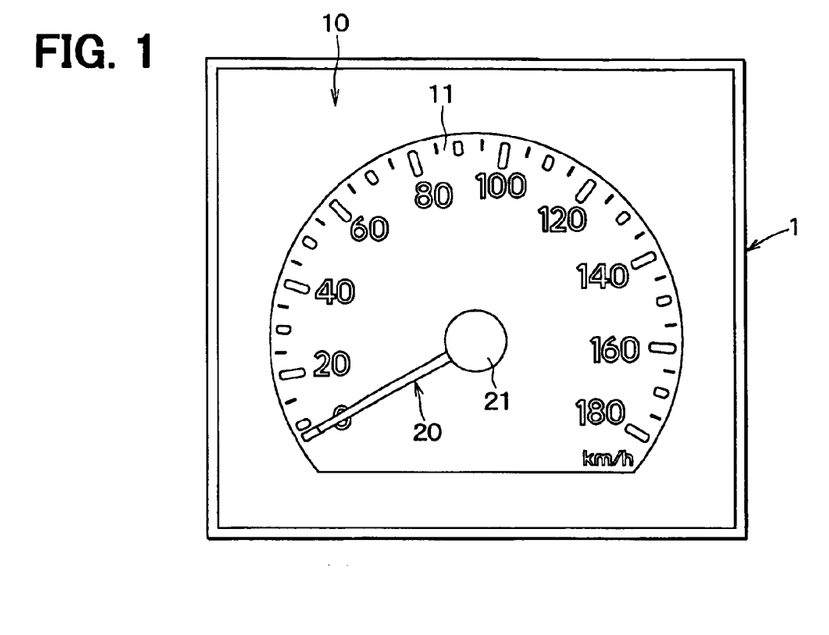
FIG. 1 is a front elevation view of a meter unit according to the first embodiment of the present invention.
Figure 2:
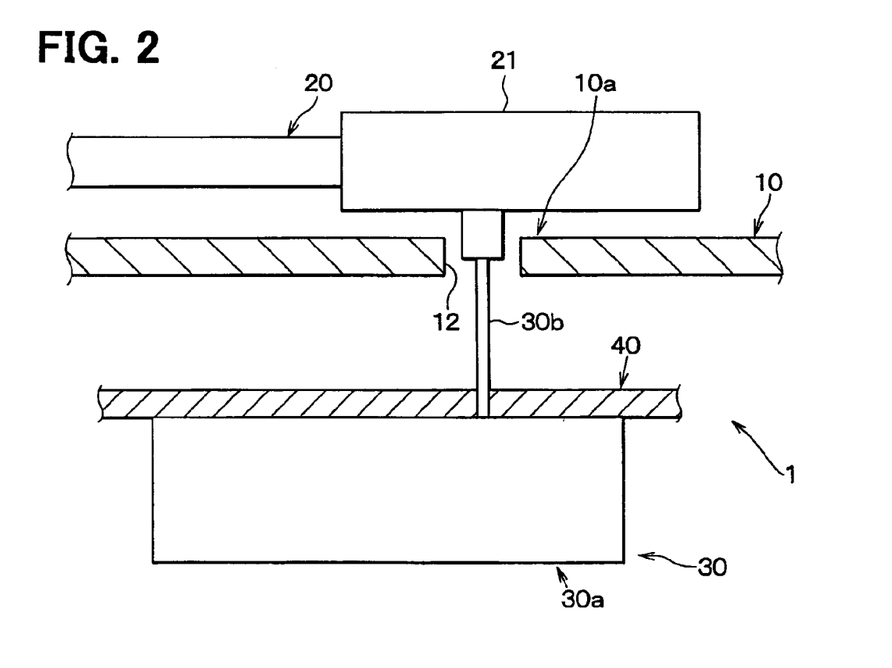
FIG. 2 is a schematic cross-sectional view of the meter unit.

As shown in FIGS. 1 and 2, a speed meter unit 1 according to the first embodiment, has a scale board 10, a pointer 20, a pointer driving unit 30 and a wiring board 40 having an electric circuit (not shown). The scale board 10 has a speed scale 11, which indicates speed with the use of the pointer 20 from a minimum value (0 km/h) to a maximum value (180 km/h). Moreover, the pointer 20 is supported by a pointer support 21, which is integrated with one end of a shaft 30b, so that the pointer 20 is rotated on the speed scale 11. The pointer control unit 30 includes the pointer control main unit 30a and a pointer control shaft 30b. The pointer control main unit 30a is disposed over the surface of the wiring board 40, which is opposite to the scale board 10 with respect to the wiring board 40. Moreover, the pointer control unit 30 rotatably supports the shaft 30b.

Next, the structure of the pointer control unit 30 will be described with reference to FIGS. 3 to 5.

Figure 3:
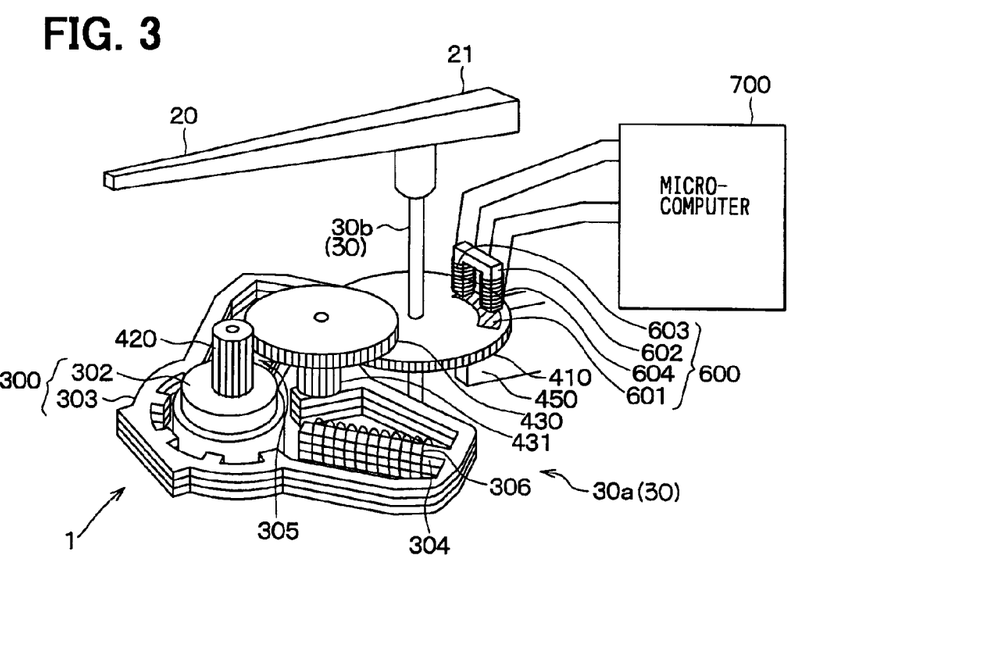
FIG. 3 is a perspective view of a pointer control unit of the meter unit.

As shown in FIG. 3, the pointer control main unit 30a includes a double-phase type stepping motor 300, a first gear 420, upper and lower second gears 430, 431, a third gear 410 serving as a rotation, a stopper 450 and a pointer position detector 600. The stepping motor 300 includes a magnet rotor 302 and a substantially annular yoke 303, which has magnetic poles 304, 305 projecting thereinto. Moreover, the upper and lower second gears 430, 431 are integrated.

Figure 4:
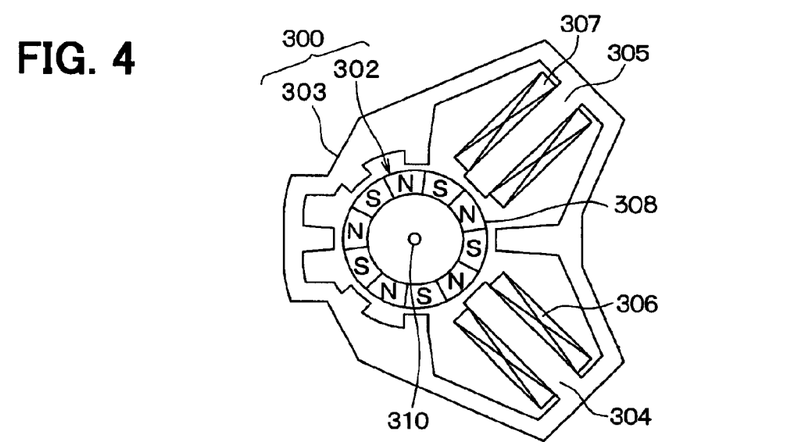
FIG. 4 is an illustrative plan view of the pointer control unit of the meter unit.

As shown in FIG. 4, the magnetic pole 304 is wound with an A-phase coil 306, and the magnetic pole 305 is wound with a B-phase coil 307. The coils 306, 307 respectively let the magnetic poles 304, 305 generate cosine-waved magnetic fluxes, phases of which are different, to rotate the magnet rotor 302. The magnet rotor 302 is engaged with a rotation shaft 310 and surrounded by the yoke 303. The magnet rotor 302 and the rotation shaft 310 are rotatably supported by a motor case 500 shown in FIG. 5. The circumferential portion of the magnet 302 is an annular magnet unit 308, to which some magnets are integrated so that different magnetic poles should be disposed alternately in the circumferential direction thereof. One end of each of the magnetic poles 304, 305 opposes the magnet unit 308, keeping a predetermined gap therebetween. Accordingly, the magnet rotor 302 rotates by the force of the cosine-waved magnetic fluxes flowing from the ends of the magnetic poles 304, 305 toward the magnet unit 308.

Referring to FIG. 3, the first gear 420 and the magnet rotor 302 are rotatably supported by the motor case 500, and the first gear 420 is geared with the upper second gear 430. Moreover, the second gears 430, 431 are rotatably supported by the motor case 500, and the lower second gear 431 is geared with the third gear 410. The third gear 410 is engaged with the pointer shaft 30b rotatably supported by the motor case 500. The first gear 420 indirectly rotates the pointer shaft 30b in a rotation speed lower than that of the stepping motor 300 through the second gears 430, 431 and the third gear 410.

As shown in FIG. 3, the pointer position detector 600 includes an arcuate magnetic piece 601 and a substantially U-shaped yoke 602. The magnetic piece 601 is made of a soft magnetic material and is mounted on the upper surface of the third gear 410. When the pointer 20 has returned to an initial position over the speed scale 11, such as a zero point, both ends of the yoke 602 oppose the magnetic piece 601 with predetermined gaps therebetween. An output pole of the yoke 602 is wound with an output coil 604, so that the output coil 604 can generate magnetic flux toward a part, opposing the end of the output pole, of the third gear 410. The detection pole of the yoke 602 is wound with a detection coil 603. The detection coil 603 detects the magnetic flux from a part, opposing the end of the detection pole, of the third gear 410 through the end of the detection pole and outputs a detection signal thereof.

Figure 5:
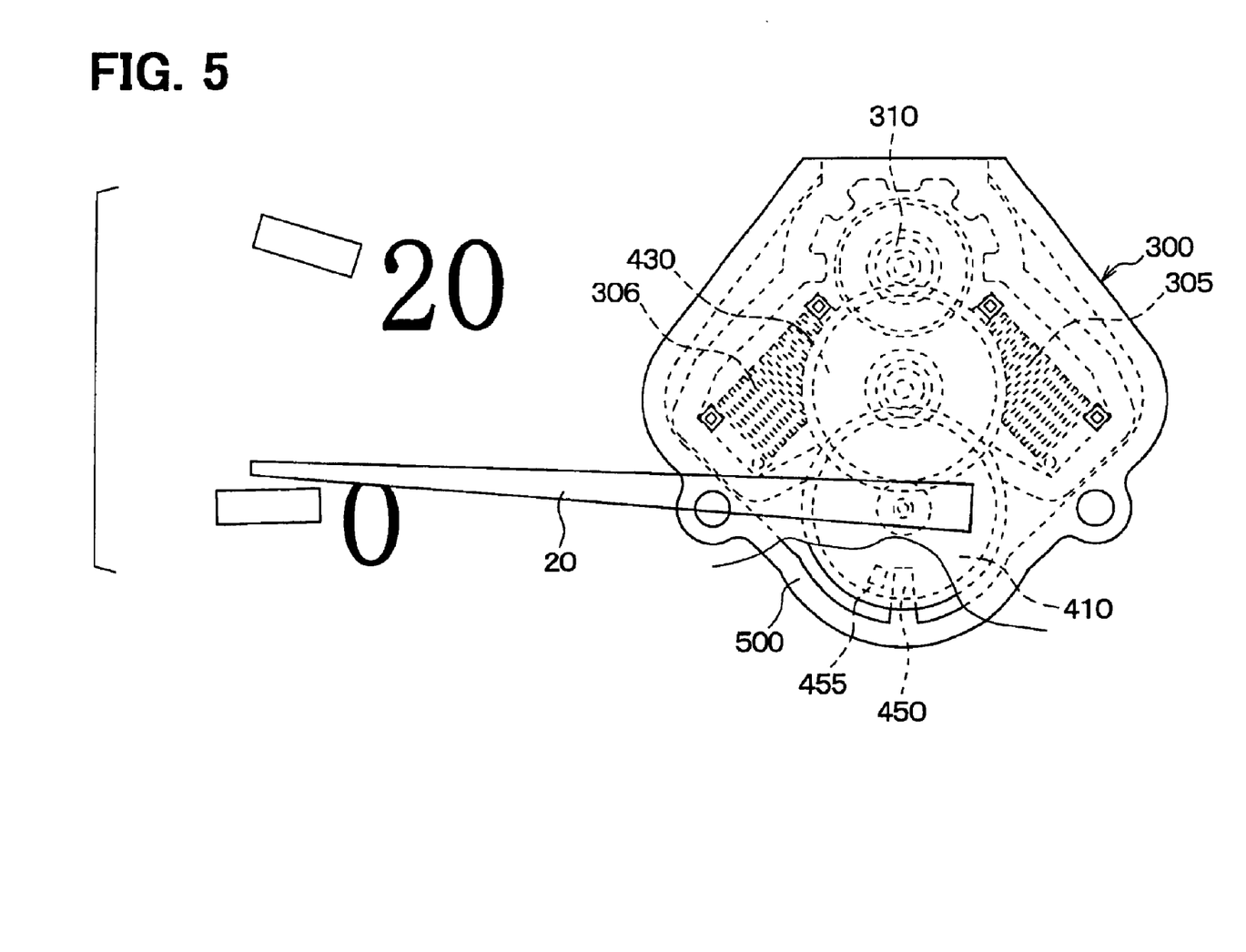
FIG. 5 is a visualized plan view of the pointer control.

As shown in FIG. 5, the stopper 450 projects from a motor case 500. When the pointer 20 has returned to the initial position over the speed scale 11, the stopper 450 supports a projection 455 formed on the lower surface of the third gear 410, so that the rotation of the third gear 410 is stopped.

Figure 6:
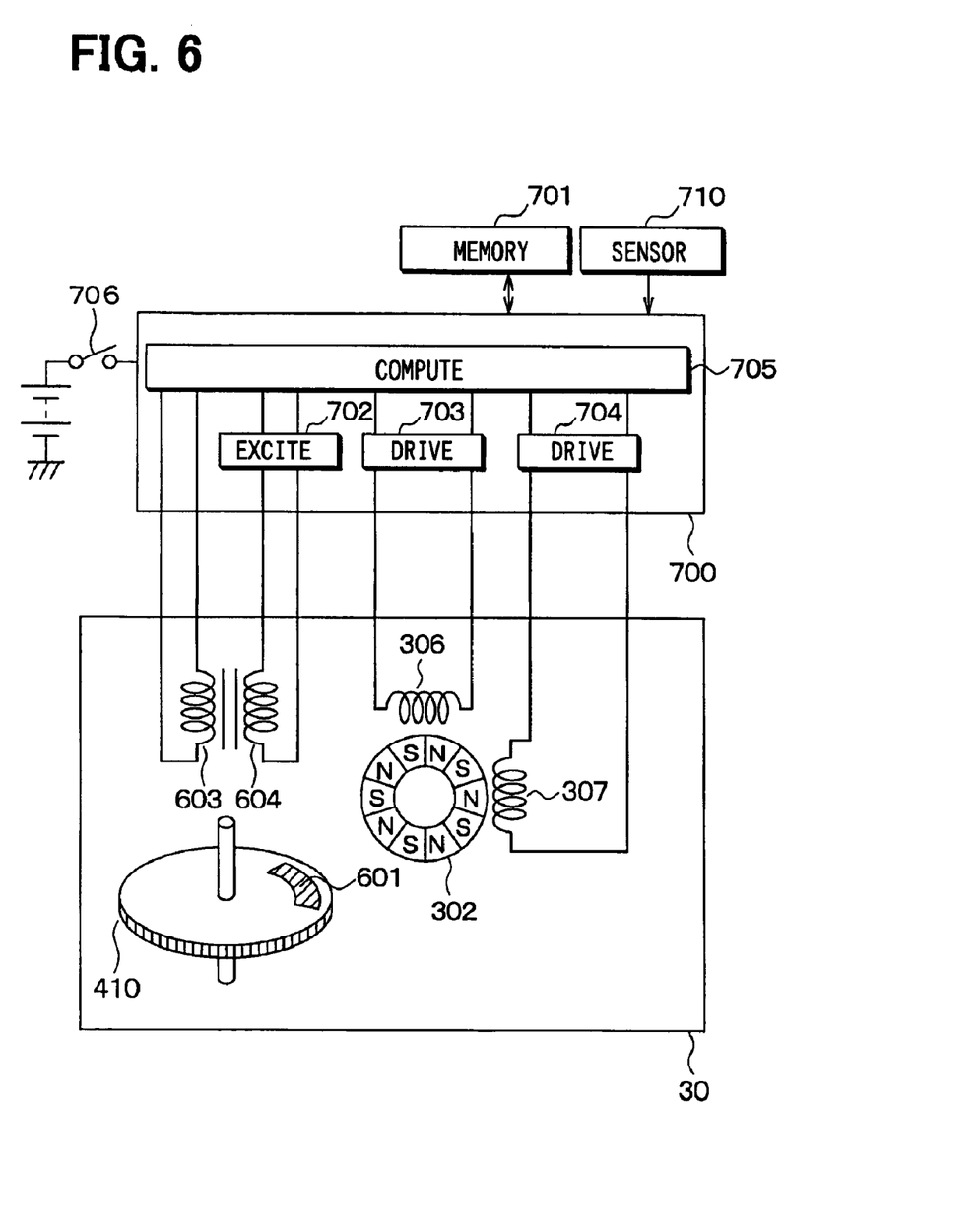
FIG. 6 is a circuit diagram of an electric circuit of the meter unit.

Next, the electric circuit of the speed meter unit 1 for controlling the stepping motor 300 will be described with reference to FIG. 6.

The speed meter 1 has a microcomputer 700 and a nonvolatile memory 701 in the electric circuit. The microcomputer 700 includes a magnetic exciting circuit 702, drive circuits 703, 704 and a computing device 705. The magnetic exciting circuit 702 generates a pulsed voltage in the output coil 604. The drive circuits 703, 704 respectively generate cosine-waved voltages, the phases of which are different, in the coils 306, 307.

The computing device 705 computes the rotational angle of the pointer 20 to be rotated in response to signals from a speed sensor 710 and performs processes for controlling the drive circuits 703, 704 so as to rotate the pointer 20 by the computed rotational angle. Moreover, when an ignition switch 706 is turned on, the computing device 705 performs processes for controlling the drive circuits 703, 704 to return the pointer 20 to the initial position until receiving the output signal which means that the pointer 20 has returned to the initial position from the detection coil 603.

Next, the operation of the speed meter unit 1 will be described with reference to FIGS. 7 and 8. While the ignition switch 706 is ON, the computing device 705 performs the processes to return the pointer 20 to the initial position in accordance with the flow chart shown in FIG. 7.

At first, in a step 800, the drive circuits 703, 704 are instructed to respectively generate pulsed voltages Vs, the phases of which are the same each other. Accordingly, the coils 306, 307 respectively generate pulsed magnetic fluxes, the phases of which are the same each other, with the voltages Vs from the drive circuits 703, 704, so as to keep the magnet rotor 302 not to revolve.

Subsequently, in a step 801, the magnetic exciting circuit 702 is instructed to generate a pulsed voltage Vg in the output coil 604, and thereby the output coil 604 generates a pulsed magnetic flux toward the opposing part of the third gear 410. Next, the detection coil 603 responds to the magnetic flux passing through the magnetic piece 601 and thereby generates a detection voltage Vdet. Moreover, in a step 802, the voltage Vdet between both terminals of the detection coil 603 is detected by the computing device 705. Further, in a step 803, the computing device 705 determines whether or not the voltage Vdet reaches a predetermined value, i.e., whether or not the pointer 20 has returned to the initial position.

Figure 8A:
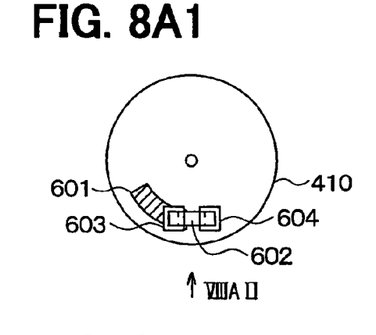
Figure 8A:
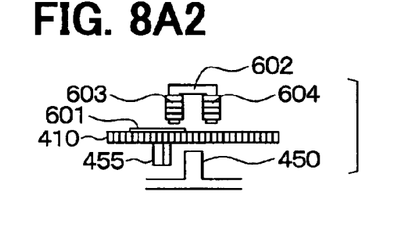
Figure 8A:
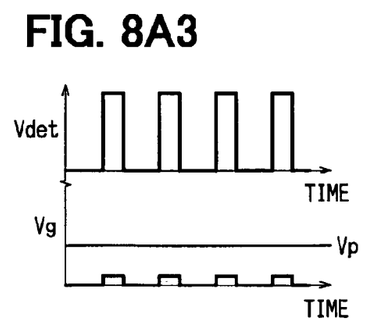

Specifically, as shown in FIGS. 8A1 and 8A2, when the projection 455 of the third gear 410 has not reached the stopper 450, at least one of the poles of the yoke 602 does not oppose the magnetic piece 601. In this state, the magnetic piece 601 cannot be passed through by the generated magnetic flux. As a result, as shown in FIG. 8A3, since the voltage Vdet does not reach a predetermined value Vp, the computing device 705 determines the voltage Vdet as NO in a step 803. Subsequently, in a step 806, the drive circuits 703, 704 are instructed to respectively generate cosine-waved voltages Vdr, the phases of which are different by 90 degrees, to drive the stepping motor 300 and return the pointer 20 to the initial position. Specifically, the drive circuit 703 generates a high voltage Vdr in the A-phase coil 306, and the drive circuit 704 generates a low voltage Vdr in the B-phase coil 307. In addition, the driving circuits 703, 704 respectively change the voltages Vdr in the coils 306, 307 into cosine-waved voltages by one cycle (360 degrees). Accordingly, the coils 306, 307 respectively make the magnetic poles 304, 305 generate the magnetic fluxes, the phases of which are different by 90 degrees. Thereafter, the cosine-waved magnetic fluxes from the magnetic poles 304, 305 respectively pass through the magnet rotor 302, so that the magnet rotor 302 revolves and rotates the gears 410, 420, 430 and 431. Consequently, the pointer 20 and the pointer shaft 30b are rotated by a predetermined angle. Afterward, the steps 800–803 and 806 are repeated until the voltage Vdet is determined to have reached the predetermined value.

Figure 8B:
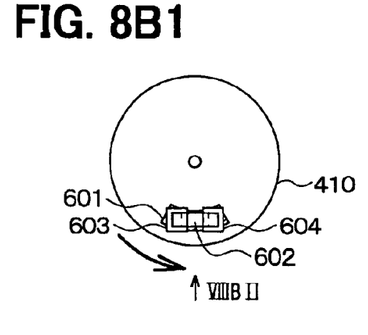
Figure 8B:
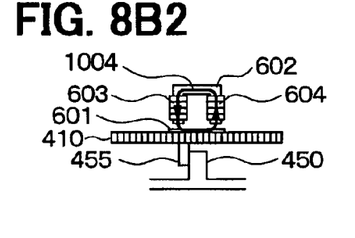

As shown in FIGS. 8B1 and 8B2, when the projection 455 of the third gear 410 has reached the stopper 450, both polar ends of the yoke 602 oppose the ends of the magnetic piece 601, so that the magnetic piece 601 can be passed through by the generated magnetic flux from the output magnetic pole to the detection magnetic pole of the yoke 602. In this state, as indicated in an arrow 1004, the magnetic flux generated in the output magnetic pole passes through the magnetic piece 601 and the detection magnetic pole. Accordingly, the voltage Vdet, which is generated in the detection coil 603 by the magnetic flux, reaches the predetermined value Vp shown in FIG. 8B3. Accordingly, in the step 803, the detection voltage is determined as YES, i.e., that the pointer 20 has returned to the initial position.

Subsequently, in a step 804, the drive circuits 703, 704 are instructed to stop generating the voltages Vdr. Moreover, in a step 805, the speed meter unit 1 is shifted to a regular operational mode. In the regular operational mode, the computing device 705 computes the rotational angle of the pointer 20, to indicate the speed over the speed scale 11, in correspondence with the signals from the speed sensor 710. Moreover, the computing device 705 controls the drive circuits 703, 704 to rotate the pointer 20 in correspondence with the computed rotational angle.

As described above, the speed meter unit does not employ a mechanical switch for a device to detect the initial position of the pointer 20 on the scale 11, but a magnetic switch including the magnetic piece 601, the yoke 602, the output coil 604 and the detection coil 603. Accordingly, even though the magnetic switch is soiled or oxidized, due to its contactless mechanism, it can be determined whether or not the pointer 20 has returned to the initial position irrespective of the soil or the oxidization thereof. Consequently, the detection of the pointer 20 in the initial position can be performed accurately and securely.

(Second Embodiment)

Figure 9:
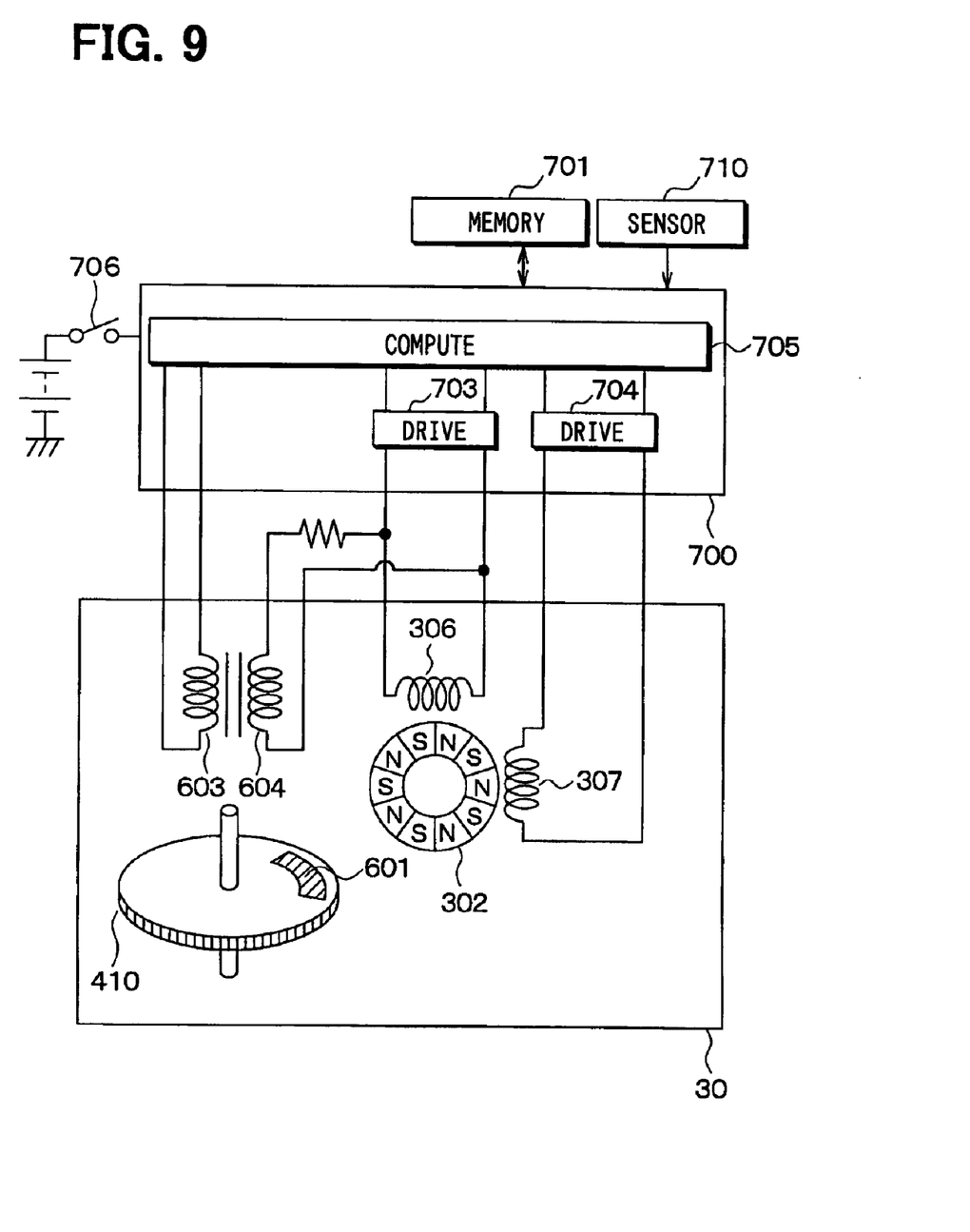
FIG. 9 is a circuit diagram of an electric circuit of a meter unit according to the second embodiment of the present invention.

In the second embodiment, the magnetic flux is generated in the output coil 604 with the use of the drive circuit 703. As shown in FIG. 9, instead of the magnetic exciting circuit 702 used in the first embodiment (FIG. 6), the terminals of the output coil 604 are respectively connected to the terminals of the drive circuit 703 so as to generate the magnetic flux through the use of the pulsed voltage Vdr. In addition, instead of the flow chart shown in FIG. 7, the computing device 705 performs the processes for returning the pointer 20 to the initial position in accordance with a flow chart shown in FIG. 10. Steps shown in FIG. 10 which are essentially the same as those shown in FIG. 7 are indicated by same numerals shown in FIG. 7.

The operational processes of the speed meter unit 1 according to the second embodiment are as follows. At first, while the ignition switch 706 is ON, the computing device 705 performs the process to return the pointer 20 to the initial position in accordance with the flow chart shown in FIG. 10. As well as the first embodiment, in the step 800, the drive circuits 703, 704 respectively are instructed to generate pulsed voltages Vs, the phases of which are the same each other, so as to keep the magnet rotor 302 not to revolve. Simultaneously, the drive circuit 703 is instructed to generate the pulsed voltage Vg in the output coil 604, so that the output coil 604 generates the pulsed magnetic flux.

Figure 10:
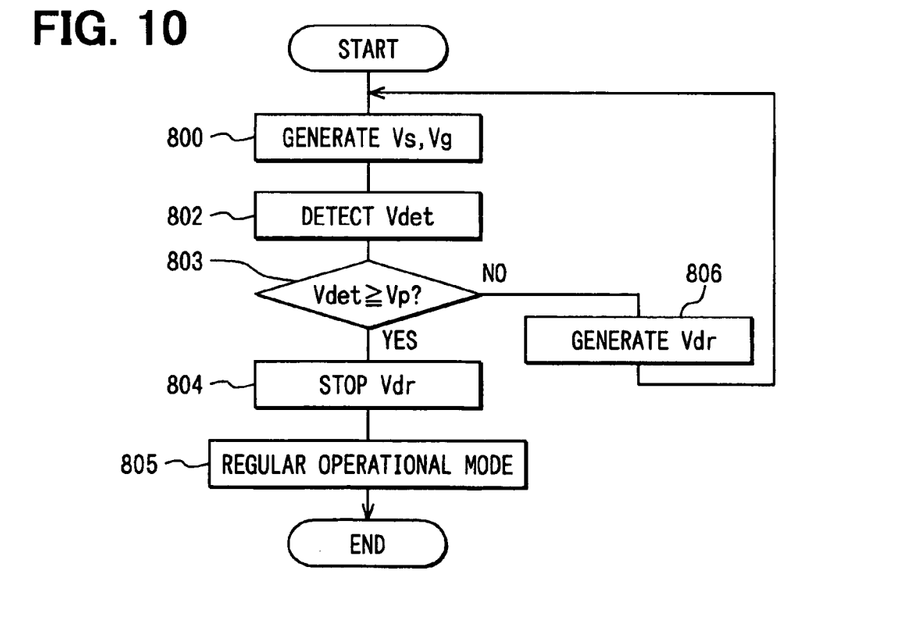
FIG. 10 is a flow chart showing processing of the electric circuit of the meter unit according to the second embodiment of the present invention.

Next, in the step 802, the voltage Vdet between both terminals of the detection coil 603 is detected. Subsequently, in the step 803, the computing device determines whether or not the detection voltage Vdet reaches the predetermined value Vp, i.e., whether or not the pointer 20 has returned to the initial position. When the detection voltage is determined as NO in the step 803, the steps 800–803, 806 are repeated until the voltage Vdet has reached the predetermined value Vp. Afterward, when the voltage Vdet has reached the predetermined value Vp, the voltage Vdet is determined as YES in the step 803, and the processes of the steps 804, 805 are performed.

Accordingly, in this embodiment, it is needless to provide the magnetic exciting circuit 702 of the first embodiment for generating the magnetic flux in the output coil 604, so that the structure can be simplified.

(Third Embodiment)

Figure 11:
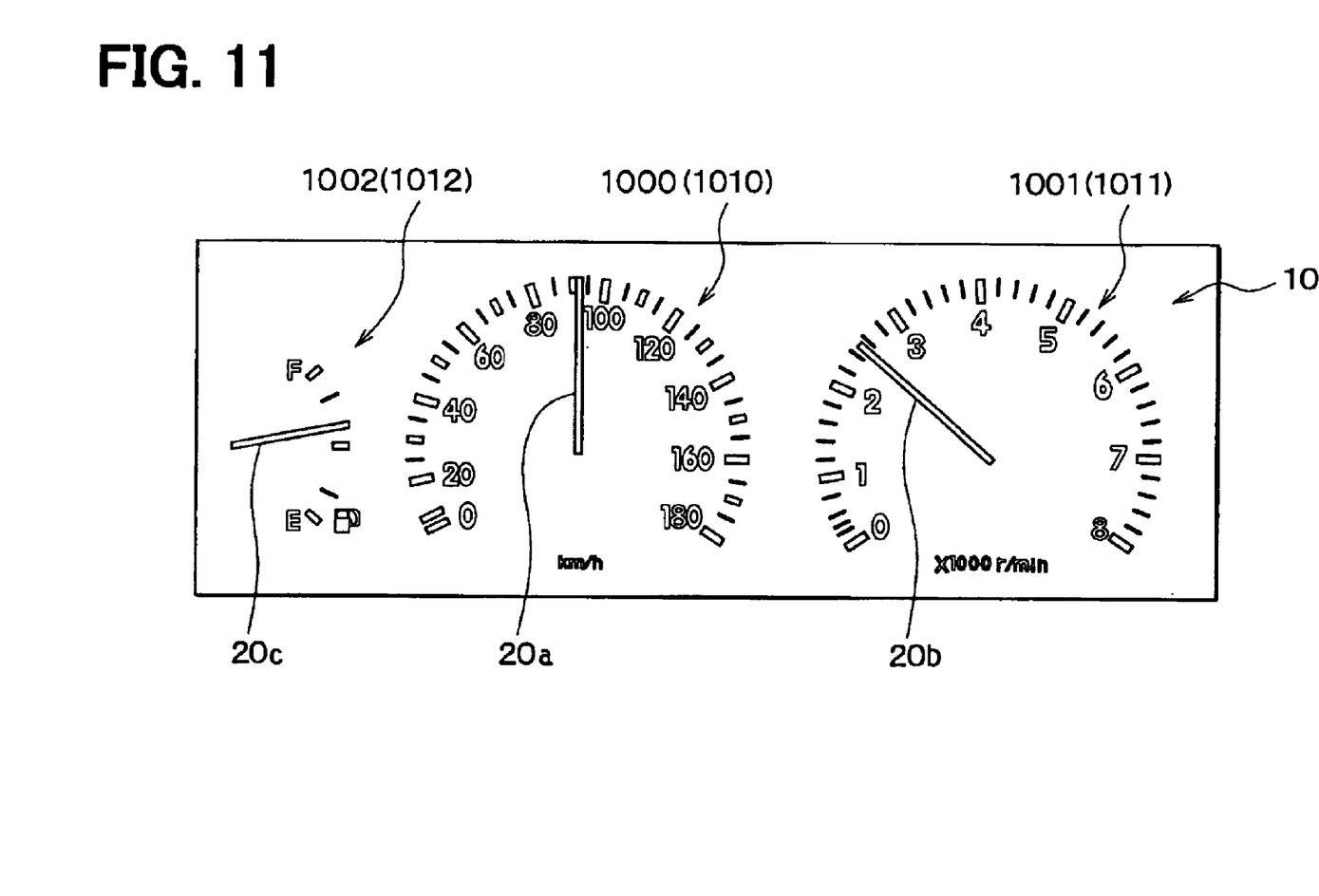
FIG. 11 is a front elevation view of a combination meter unit according to the third embodiment of the present invention.
Figure 12:
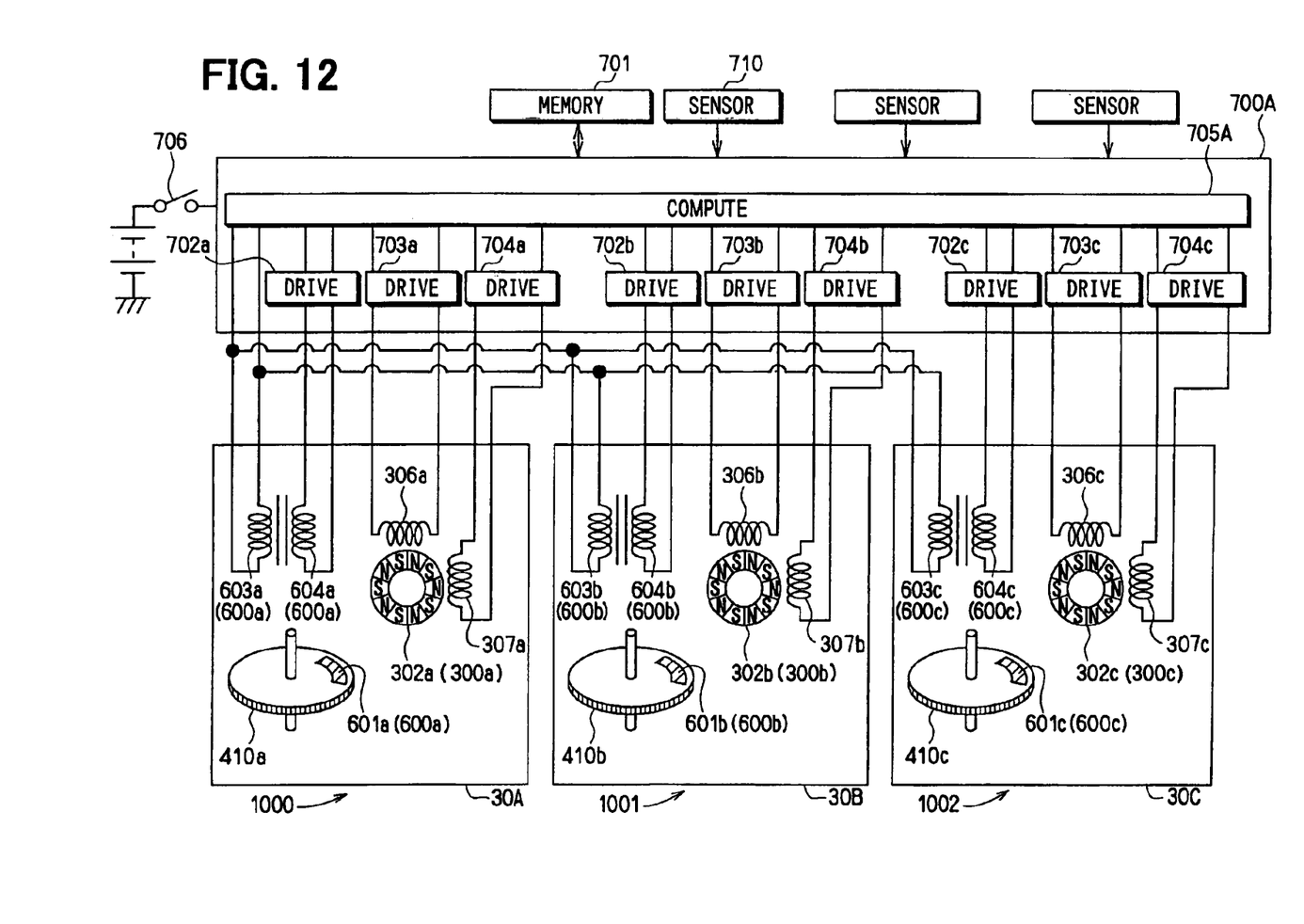
FIG. 12 is a circuit diagram of an electric circuit of the combination meter unit.

In the third embodiment, as shown in FIG. 11, a combination meter unit 10, including a speed meter subunit 1000, a tachometer subunit 1001 and a fuel meter subunit 1002, has a mechanism in which the respective meter subunits 1000–1002 can reset the corresponding pointers 20a–20c with time-sharing. Except the microcomputer, respective meter subunits 1000–1002 have substantially the same components as those of the speed meter unit 1 according to the first embodiment. As shown in FIG. 12, the combination meter unit 10 has a microcomputer 700A, pointer control main units 30A–30C. The pointer control main units 30A–30C are provided for the respective meter subunits 1000–1002 and have the same components as those of the pointer control main unit 30 of the speed meter unit 1 according to the first embodiment.

The microcomputer 700A has three drive circuits 703a–703c, three drive circuits 704a–704c and three magnetic exciting circuits 702a–702c, a set of which is provided for each meter subunit, so that respective meter subunits 1000–1002 substantially have the same components as those of the speed meter unit 1 according to the first embodiment. A computing device 705A detects, with time-sharing, the voltage Vdet of each detection coil 603a–603c and thereby determines whether the corresponding pointer 20a–20c has returned to the corresponding initial position. Each set of the driving circuits 703a–703c, 704a–704c is continuously controlled by the computing device 705A with time-sharing to return the corresponding pointer 20a–20c to the corresponding initial position until the computing device 705A determines that the corresponding pointer 20a–20c has returned to the corresponding initial position.

Figure 7:
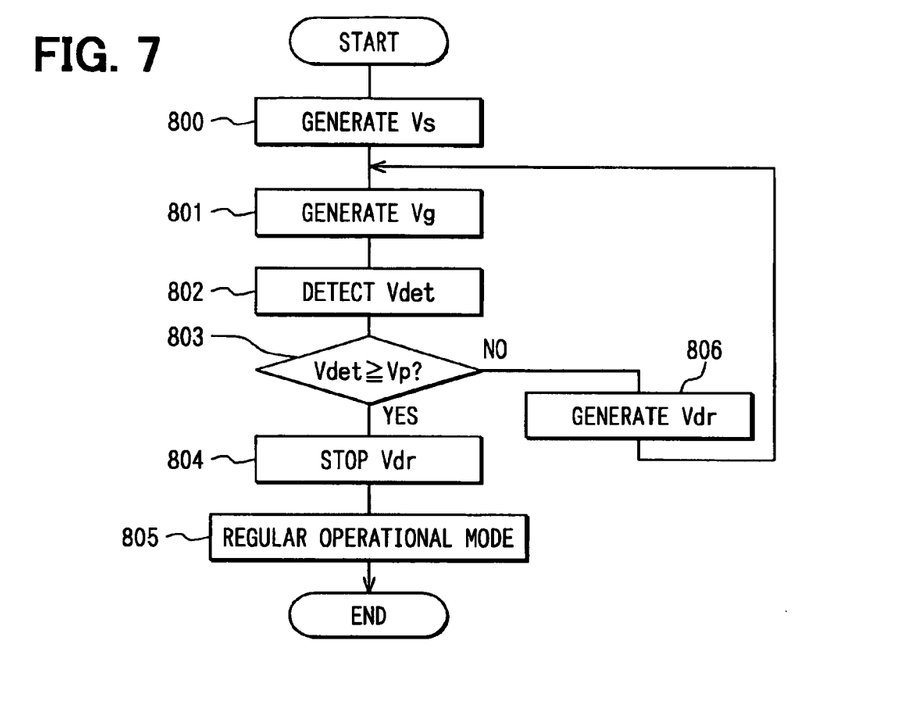
FIG. 7 is a flow chart showing processing of the meter unit.
Figure 8B:
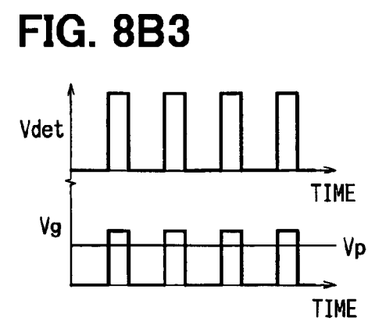
Figure 13:
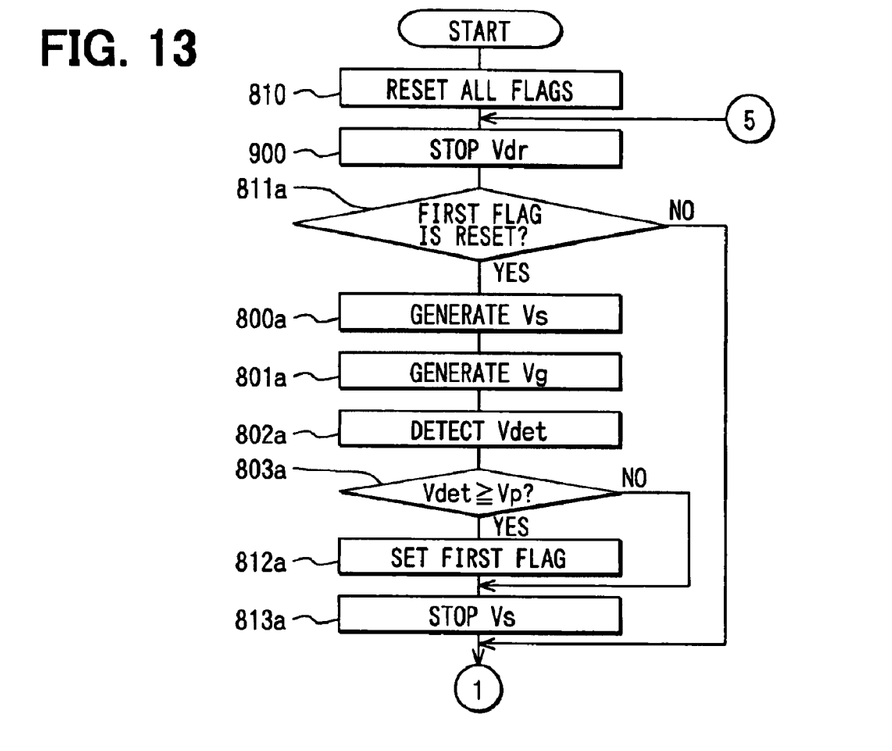
FIG. 13 is a flow chart showing first processing of the electric circuit of the combination meter unit.
Figure 14:
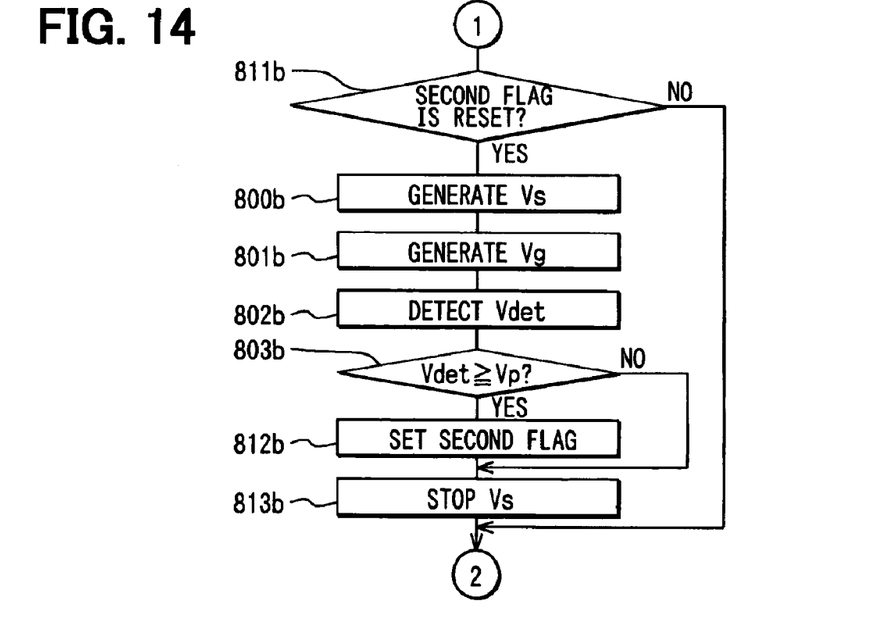
FIG. 14 is a flow chart showing second processing of the electric circuit of the combination meter unit.
Figure 15:
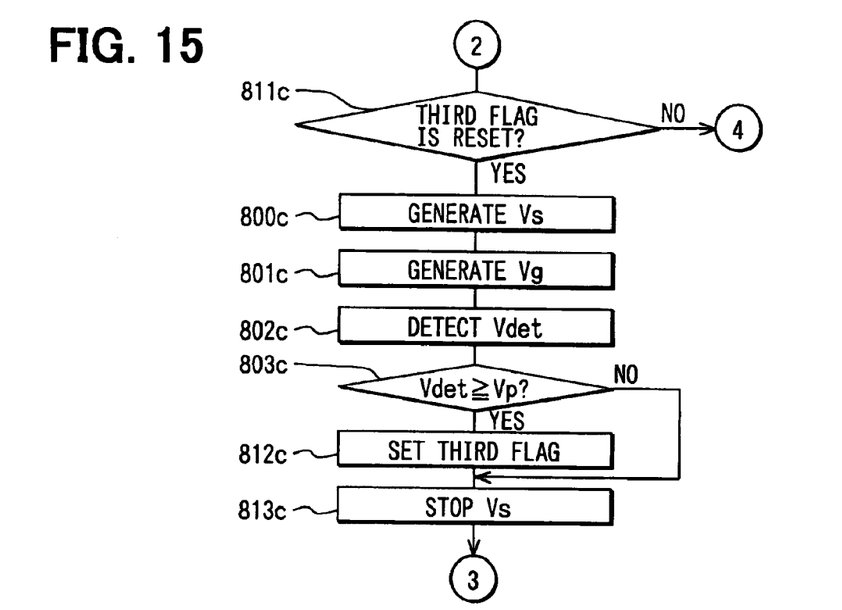
FIG. 15 is a flow chart showing third processing of the electric circuit of the combination meter unit.
Figure 16:
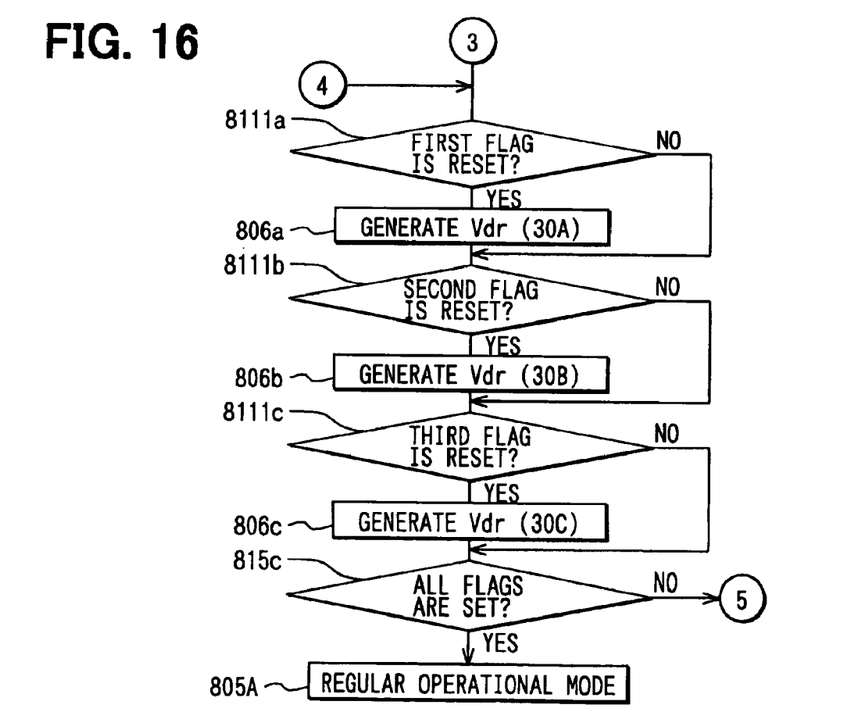
FIG. 16 is a flow chart showing fourth processing of the electric circuit of the combination meter unit.

Instead of the flow chart shown in FIG. 7, the computing device 705A performs the processes to reset the respective pointers 20a–20c in accordance with flow charts shown in FIGS. 13 to 16. Steps 800a to 800c shown in FIGS. 13 to 15 are essentially the same as the step 800 shown in FIG. 7, and steps 801a–801c are essentially the same as the step 801. Moreover, steps 802a to 802c and steps 803a to 803c are essentially the same in this order as the step 802 and the step 803. Furthermore, steps 806a to 806c shown in FIG. 16 are essentially the same as the step 806.

Next, the operation of the combination meter 10 will be described with reference to the FIGS. 13 to 15. At first, while the ignition switch 706 is ON, in step 810 the microcomputer 700A resets first to third detection flags. Specifically, each detection flag is for storing whether or not each pointer 20a–20c is positioned in the corresponding initial position, and the state of each detection flag is stored in a nonvolatile memory 701.

Subsequently, in step 900, the respective drive circuits 703, 704 are instructed to stop generating the voltages Vdr for the respective stepping motors 300a–300c.

Next, in the step 811a, the computing device 705A determines whether or not the first detection flag is reset. When the first detection flag is detected to be reset, a process for the pointer control main unit 30A is performed in the step 800a. That is, the drive circuits 703a, 704a output the pulsed voltages Vs, the phases of which are the same, so as to keep the magnet rotor 302a not to revolve.

Subsequently, in the step 801a, the magnetic exciting circuit 702a generates the pulsed voltage Vg in the output coil 604a to generate the magnetic flux. Moreover, in the step 802a, the computing device 705A detects the voltage Vdet. Further, in the step 803a, the computing device 705A determined whether or not the voltage Vdet reaches the predetermined value Vp. When the voltage Vdet is determined to have reached the predetermined value Vp, the computing device 705A determines that the pointer 20a has returned to the initial position. Subsequently, in the steps 812a, 813a, the first detection flag is set, and drive circuits 703, 704 stops outputting the voltages Vdr.

Afterward, the processes for the pointer control main unit 30A in the steps 811a, 800a, 801a to 803a, 812a and 813a are respectively performed for the pointer control main units 30B, 30C in steps 811b, 800b, 801b to 803b, 812b, 813b shown in FIG. 14 and steps 811c, 800c, 801c to 803c, 812c, 813c shown in FIG. 15.

Subsequently, in a step 8111a shown in FIG. 16, the computing device determines whether or not the first detection flag is reset. When the flag is determined to be reset, in the step 806a the drive circuits 703a, 704a are instructed to generate the voltages Vdr to the stepping motor 300a to return the pointer 20a to the initial position. Subsequently, in a step 8111b, the computing device determines whether or not the second detection flag is reset. When the second detection flag is determined to be reset, in the step 806b the drive circuits 703b, 704b generate the voltages Vdr to the stepping motor 300b to return the pointer 20b to the initial position. Moreover, in a step 8111c, the computing device 705A determines whether or not the third detection flag is reset. When the third detection flag is determined to be reset, in the step 806c the drive circuits 703c, 704c generate the voltages Vdr to the stepping motor 300c to return the pointer 20c to the initial position.

Moreover, in a step 815c, the computing device 705A determines whether or not all the detection flags are set. When it is determined that all the detection flags are not set, the subsequent process is returned to the step 900 shown in FIG. 13, and the successive processes from the step 900 to the step 815c are repeated until all the detection flags are determined to be set in the step 815c.

(Fourth Embodiment)

Figure 17A:
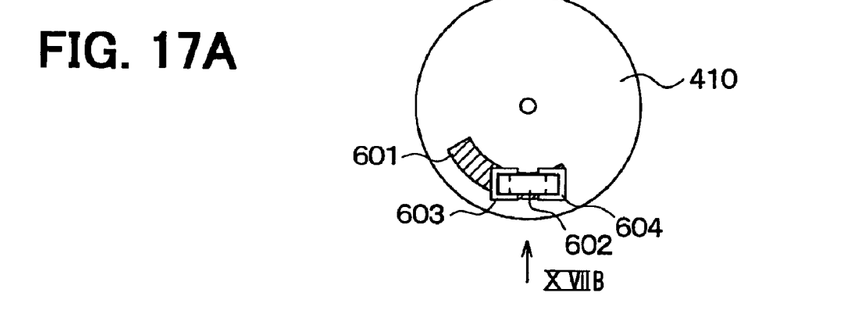
FIGS. 17A and 17B are plan and side views of a pointer position detector of the meter units according to the first and second embodiments and the combination meter unit according to the third embodiment of the present invention.
Figure 17B:
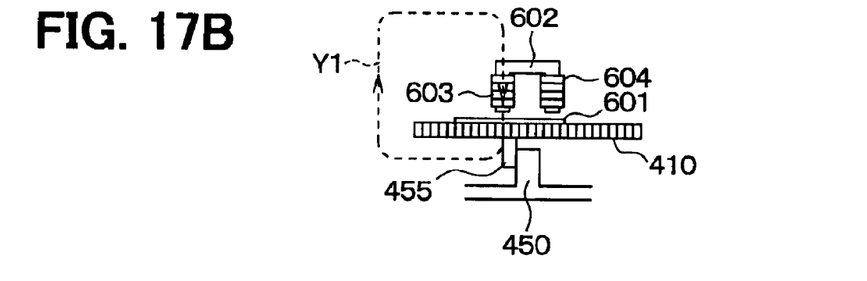

As shown in FIGS. 17A and 17B, in the pointer position detectors according to the above embodiments, while the magnetic flux from the outside passes as indicated by an arrow Y1 through the second pole, on which the detection coil 603 is wound, of the yoke 602, the detection coil 603 is likely to generate the voltage Vdet caused by the magnetic flux. Therefore, the pointer position detector has a potential to accidentally detect that the pointer has returned to the initial position.

Figure 18A:
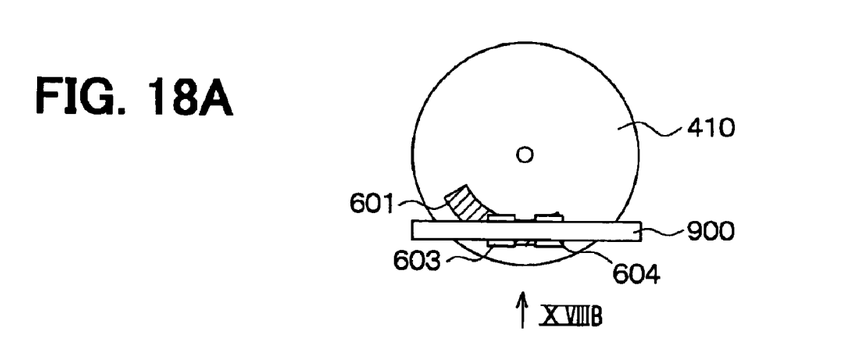
FIGS. 18A and 18B are plan and side views of a pointer position detector of a meter unit or a combination meter unit according to the fourth embodiment of the present invention.
Figure 18B:
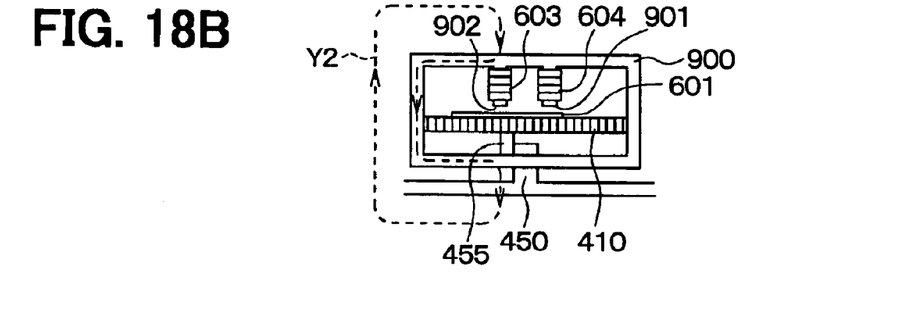

In the fourth embodiment, as shown in FIGS. 18A and 18B the pointer position detector employs a magnetic shield 900 for shielding the magnetic piece 601 and the detection coil 603 from the magnetic flux from the outside. The magnetic shield 900 is made of a soft magnetic material and has an annular shape so as to surround a part of the third gear 410, the magnetic piece 601, the output coil 604 and the detection coil 603. Accordingly, as indicated by an arrow Y2, the magnetic shield 900 prevents the magnetic flux from the outside from passing through the magnetic piece 601 and the detection coil 603.

In addition, the magnetic shield 900 has an output magnetic pole 901 and a detection magnetic pole 902, each of which projects toward the third gear 410. The magnetic poles 901, 902 are respectively wound with the output coil 604 and the detection coil 603, so as to serve as the magnetic poles. That is, the magnetic shield 900 is integrated with the magnetic poles for the output coil 604 and the detection coil 603.

(Fifth Embodiment)

Figures 19A, 19B:
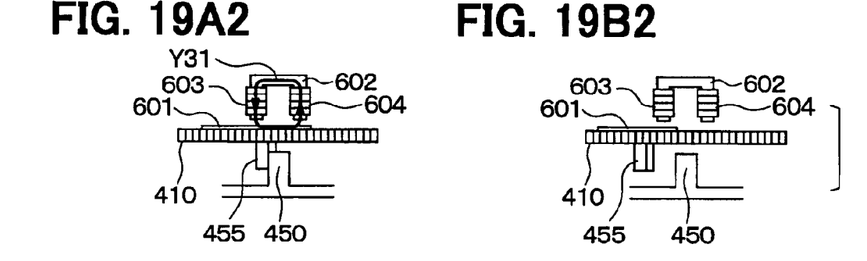
Figures 19A, 19B:
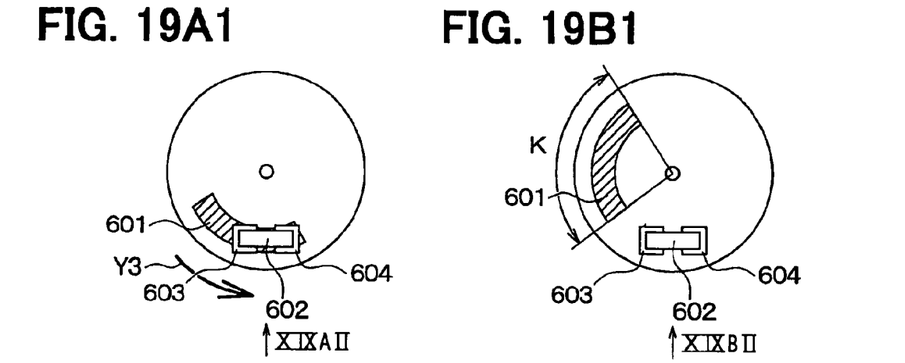

In the above embodiments, when the third gear 410 rotates, and thereby the pointer has returned to the initial position, i.e., as shown in FIGS. 19A1 and 19A2, when the third gear 410 rotates in a direction indicated by an arrow Y3, and the projection 455 has reached the stopper 450, the magnetic piece 601 serves as the magnetic route, through which the magnetic flux can pass as indicated by an arrow Y31.

In the fifth embodiment, as shown in FIGS. 19B1 and 19B2, the magnetic piece 601 is formed in an arcuate shape the angle K of which should be larger than that of the magnetic piece 601. Specifically, in addition to a functional structure shown in FIGS. 19A1 and 19A2, when the third gear 410 rotates in the clockwise direction as indicated by an arrow Y4 shown in FIG. 19C1, and the projections 455 has reached the stopper 455, the magnetic piece 601 serves as the magnetic route, through which the magnetic flux can pass as indicated in an arrow Y32 shown in FIG. 19C2.

(Sixth embodiment)

Figures 19C, 19C, 20:
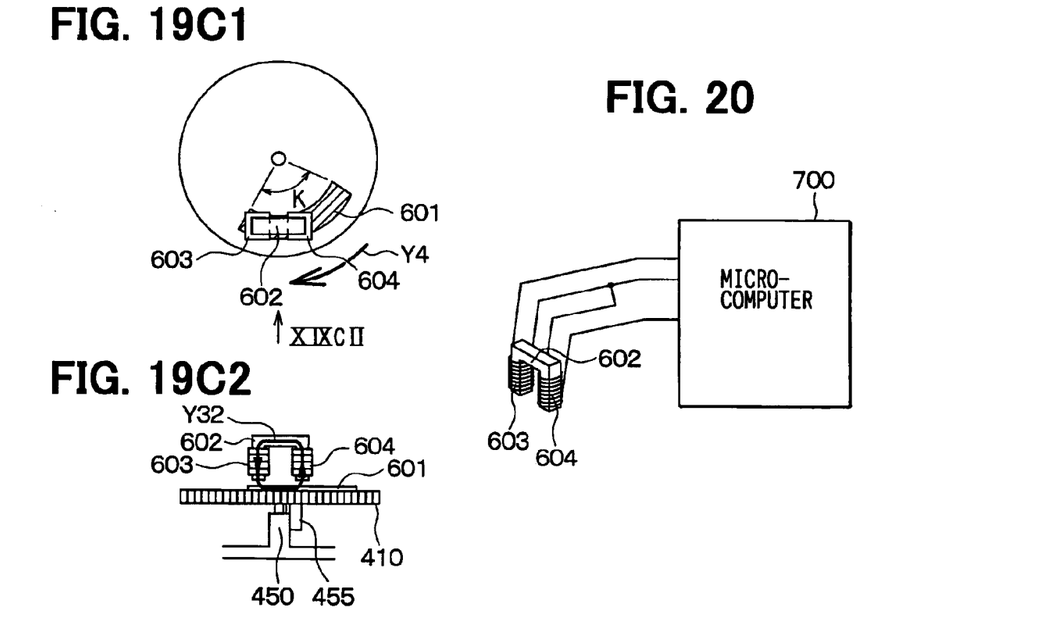

In the sixth embodiment, as shown in FIG. 20, the grand terminal of the output coil 603 is connected to one terminal of the detection coil 603.

The present invention should not be limited to the embodiments previously discussed and shown in the figures, but may be implemented in various ways without departing from the spirit of the invention.

For example, the magnetic piece 601 is may be made of the other magnetic materials than the soft magnetic material that can form the magnetic route.

Moreover, the magnetic piece 601 may be disposed in any other positions where the magnetic piece 601 can serve as the magnetic route when the projection 455 has reached the stopper 450.

Moreover, the meter device may be the other meters, such as a thermometer, a pressure indicator, an ammeter and a voltmeter and combination meter including the same.

Moreover, the voltages Vdr generated by the drive coils toward the stepping motor may be various kinds of alternating current voltages. Additionally, the cosine-waved voltage may be outputted in the PWM (Pulse Width Modulation) method. Moreover, the voltage Vg outputted to the output coil 604 may be the various kinds of the alternating current voltages.

Furthermore, in the third embodiment, similar to the second embodiment, the pulsed magnetic flux may be outputted from the output coil 604 with the use of the drive circuit 703. In addition, while the ignition switch 706 is ON, the processes from the step 810 may be performed after the computing device 705 has rotated each pointer 20 by a predetermined angle.

What is claimed is:

1. A meter unit comprising:

a scale;

a pointer that rotates over the scale;

a pointer control means;

a rotation member controlled by the pointer control means integrally with the pointer; and a pointer position detector for detecting that the pointer is positioned in a predetermined position over the scale, wherein the pointer position detector includes:

a magnetic material installed in a part of the rotation member; and an output coil for generating magnetic flux toward the rotation member and a detection coil for detecting the magnetic flux thereby to magnetically detect that the pointer is positioned at the predetermined position over the scale.

2. The meter unit according to claim 1, wherein the pointer position detector includes a magnetic shield for shielding the detection coil against magnetic flux from an outside of the meter unit.

3. The meter unit according to claim 2, wherein the pointer position detector includes an output magnetic pole, which projects toward the rotation member and is wound with the output coil, and a detection magnetic pole, which projects toward the rotation member and is wound with the detection coil.

4. The meter unit according to claim 3, wherein the output magnetic pole and the detection magnetic pole are integrally formed in the magnetic shield and project therefrom toward the rotation member.

5. The meter unit according to claim 1, further comprising a rotation stopping means that stops a rotation of the rotation member, so that the magnetic flux from the output coil passes through the magnetic material and reaches the detection coil, when the pointer is positioned at the predetermined position.

6. The meter unit according to claim 5, wherein:

the predetermined position is provided at a plurality of locations on the scale; and the rotation stopping means stops the rotation of the rotation member so that the magnetic material forms the magnetic route when the pointer is positioned at the predetermined position at any one of the plurality of locations.

7. The meter unit according to claim 1, further comprising:

a determination means for determining whether the pointer is positioned at the predetermined position over the scale; and a control means for controlling the pointer control means, wherein the detection coil outputs an output signal, which means whether the pointer is positioned at the predetermined position over the scale, the determination means determines whether the pointer is positioned at the predetermined position over the scale in response to the output signal and outputs a determination signal indicative of a determination thereof, and the control means controls the pointer control means so as to drive the pointer in a position corresponding to the determination signal.

8. The meter unit according to claim 7, wherein:

the control means is a drive circuit; and the pointer control means is a stepping motor including a drive coil for outputting magnetic flux in response to the determination signal from the drive circuit and a magnet rotor for rotating the rotation member in response to the magnetic flux from the drive coil.

9. The meter unit according to claim 8, wherein a terminal of the output coil is connected to a terminal of the drive coil.

10. The meter unit according to claim 1, wherein one terminal of the output coil is connected to one terminal of the detection coil.

11. A combination meter unit comprising a plurality of meter subunits, each of which includes the meter unit according to claim 1.

12. The combination meter unit according to claim 11, further comprising a plurality of time-sharing control means each of which drives a corresponding pointer control means with time-sharing, so that each pointer of the meter subunits can be controlled with time-sharing.

13. The combination meter unit according to claim 11, further comprising a time-sharing determination means for determining whether each pointer is positioned in a corresponding predetermined position over the scale with time sharing in response to a corresponding output signal from a corresponding pointer position detector.

* * * * *